United States Patent
Chen (10) Patent No.: US 11,880,480 B2
(45) Date of Patent: *Jan. 23, 2024

(54) SECURE STORAGE ACCESS THROUGH RATE LIMITATION

(71) Applicant: Red Hat, Inc., Raleigh, NC (US)

(72) Inventor: Huamin Chen, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 239 days.

This patent is subject to a terminal disclaimer.

(21) Appl. No.: 17/530,260

(22) Filed: Nov. 18, 2021

(65) Prior Publication Data

US 2022/0075890 A1 Mar. 10, 2022

Related U.S. Application Data

(63) Continuation of application No. 16/052,400, filed on Aug. 1, 2018, now Pat. No. 11,200,330.

(51) Int. Cl.
| | | |
|---|---|---|
| *G06F 21/78* | (2013.01) | |
| *G06F 21/62* | (2013.01) | |
| *G06F 9/50* | (2006.01) | |
| *G06F 9/455* | (2018.01) | |
| *G06F 3/06* | (2006.01) | |

(52) U.S. Cl.
CPC ...... *G06F 21/6218* (2013.01); *G06F 9/45558* (2013.01); *G06F 9/5077* (2013.01); *G06F 3/0622* (2013.01); *G06F 9/45504* (2013.01); *G06F 9/5016* (2013.01); *G06F 21/78* (2013.01);
(Continued)

(58) Field of Classification Search
CPC ............ G06F 21/6218; G06F 9/45558; G06F 9/5077; G06F 3/0622; G06F 9/45504; G06F 9/5016; G06F 21/78; G06F 2009/45579; G06F 2009/45587; G06F 9/526; G06F 2009/45583

See application file for complete search history.

(56) References Cited

U.S. PATENT DOCUMENTS

| | | | | |
|---|---|---|---|---|
| 5,579,505 A | * | 11/1996 | Ohkami | G06F 13/1652 711/155 |
| 6,873,987 B1 | * | 3/2005 | Novaes | G06F 11/1482 707/684 |

(Continued)

FOREIGN PATENT DOCUMENTS

CN 106991321 A 7/2017

OTHER PUBLICATIONS

Tejun Heo, "Control Group v2", Oct. 2015, obtained online from <https://docs.kernel.org/admin-guide/cgroup-v2.html>, retrieved on Sep. 8, 2023 (Year: 2015).*

(Continued)

*Primary Examiner* — Farid Homayounmehr
*Assistant Examiner* — Zhimei Zhu
(74) *Attorney, Agent, or Firm* — Womble Bond Dickinson (US) LLP (57) ABSTRACT

Disclosed systems and methods initiate an instance of an isolated application on a node computing device. The systems determine that the isolated application requests exclusive access to a block storage resource, create a control group associated with the block storage resource to provide (Continued)

access to members of the control group and set an access rate limit to zero for non-members of the control group, and assig the isolated application to the control group.

20 Claims, 5 Drawing Sheets

(52) U.S. Cl.
CPC .............. *G06F 2009/45579* (2013.01); *G06F 2009/45587* (2013.01)

(56) References Cited

U.S. PATENT DOCUMENTS

| | | | |
|---|---|---|---|
| 9,772,792 B1* | 9/2017 | Wallner | ................ G06F 3/0647 |
| 9,870,288 B2 | 1/2018 | Zhao et al. | |
| 10,846,788 B1* | 11/2020 | Klein | ...................... H04L 47/83 |
| 2006/0168352 A1 | 7/2006 | Gebhart et al. | |
| 2009/0254985 A1 | 10/2009 | Weller et al. | |
| 2012/0102200 A1 | 4/2012 | Rabii | |
| 2012/0173581 A1* | 7/2012 | Hartig | ................ G06F 11/0745 |
| | | | 707/E17.001 |
| 2013/0227560 A1* | 8/2013 | McGrath | ............... G06F 9/5077 |
| | | | 718/1 |
| 2015/0095916 A1 | 4/2015 | Saga | |
| 2017/0293755 A1 | 10/2017 | Kargman et al. | |
| 2017/0308406 A1 | 10/2017 | Kusters et al. | |
| 2017/0344270 A1 | 11/2017 | Sterin et al. | |
| 2018/0048584 A1 | 2/2018 | Ra et al. | |
| 2018/0113638 A1* | 4/2018 | Petersen | ............... G06F 3/0619 |
| 2019/0369895 A1 | 12/2019 | Israni et al. | |

OTHER PUBLICATIONS

Carvalho, "Using CGroups to Limit I/O" https://andrestc.com/post/cgroups-io, Systems programming, Linux and Go, Oct. 18, 2017, 9 pages.

Gregg, "Container Performance Analysis" http://www.brendangregg.com/SlidesLISA2017_Container_Performance_Analysis.pdf, Netflix, Oct. 29, 2017, 69 pages.

Henningsen et al. "How I Used CGroups to Manage System Resources", http://www.oracle.com/technetwork/articles/servers-storage-admin/resource-controllers-linux-1506602.html, Oracle, Jan. 2012, 8 pages.

Laadan et al., "Linux-CR: Transparent Application Checkpoint-Restart in Linux", The Linux Symposium 2010, Jul. 2010, obtained online from <http://www.cs.columbia.edu/-orenl/papers/ols2010-linuxcr.pdf>, retrieved on Jul. 27, 2021 (Year: 2010).

Subramaniam et al. "Feature Highlight: CPU Manager", Jul. 24, 2018, obtained online from <https://kubernetes.io/blog/2018/07/24/feature-highlight-cpu-manager/>, retrieved on Aug. 2, 2020.

* cited by examiner

SECURE STORAGE ACCESS THROUGH RATE LIMITATION

CROSS-REFERENCE TO RELATED APPLICATIONS

This application is a continuation of U.S. patent application Ser. No. 16/052,400, filed Aug. 1, 2018, the contents of which are hereby incorporated by reference in its entirety.

TECHNICAL FIELD

Aspects of the present disclosure relate to secure authorization for memory utilization.

BACKGROUND

Distributed computing systems may include one or more processes that are distributed to a variety of computing nodes. Those nodes may enable the processes to execute in isolated processing spaces.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Distributed computing systems can include various systems and methods for resource isolation to ensure processes do not interfere with each other on a shared computing node. For example, containers, which may be grouped into pods, can provide isolated processing spaces for one or more processes of an application. However, there is no storage access isolation in place that prevents unauthorized access to persistent or ephemeral storage that belong to other processes. While data encryption can provide security for data that is stored on a computing node, in order to access or perform processes with that data, a process must often decrypt the data. Accordingly, after decryption for access or processing, unencrypted data may be stored in an unsecure location in persistent or ephemeral storage of the computing node. Therefore, data may be accessed by other processes or applications on the computing node in an unencrypted state and potentially compromised.

The present disclosure addresses the above-noted and other deficiencies by introducing systems and methods for memory isolation for particular processes. Memory isolation is provided through rate limiting of access to block storage resources within the computing node. A process that requests exclusive access to a block storage resource may be provided with all of an available access rate for the block storage resource, while other processes running on the computing node may have their access rate limited to zero. A node agent executing on the computing node can limit access rates for the block storage resource by setting control groups that set operation parameters of isolated applications, such as containers or pods that execute on the node. The node agent can also provide access to resources, including storage resources, based on control groups to which the isolated applications are assigned. Accordingly, the node agent can determine based on rate limits of a control group for accessing a block storage device whether or not to allow an isolated application to access the storage resource.

In some embodiments, processes are executed in isolated processing spaces, which may be referred to as containers. The isolated processing spaces may include the resources necessary for executing one or more processes. For example, the isolated processing spaces can include code, libraries, settings, data, or other resources isolated from surrounding environment. The isolated processing spaces enable multiple sets of processes to run on shared infrastructure in a computing node. In some embodiment, one or more isolated processes can be executed with shared resources in an isolated application, which may be referred to as a pod. In some embodiments, an isolated application may share processing resources, networking resources, memory resources, or other computing resources to provide isolated processing spaces executing an isolated process.

While the isolated processing spaces allow deployment of isolated applications to particular computing nodes within a computing system, those applications may access data stored in persistent or ephemeral storage of the computing node. Accordingly, when performing operations on data stored at the computing node, the data may exist in one or more copies in an unencrypted state. Other applications, which may also be executed in an isolated processing space, may be able to access or modify that data. In some embodiments, in order to prevent unauthorized access to data, a node agent at a computing node may use a control group to reduce the access rate of memory blocks for unauthorized applications and processes to zero. Accordingly, when an application attempts to access a storage block, if it is not assigned a set control group, the access is denied based on the rate limit.

In some embodiments, when an application is initiated in an isolated processing space at a computing node, it requests secure access to a block storage resource. The request may be processed at an orchestrator or a node agent of the computing system. In response, a node agent can create a control group associated with the block storage resource to ensure that the requesting application is provided with secure access to the block storage resource. In some embodiments, the control group indicates an access rate (such as an I/O rate) for the block storage resource. For the requesting application, the control group can provide unlimited access rates for the block storage resource. The access rate for applications not assigned to the control group is set to zero. Accordingly, the access rate limit of zero for other applications prevents any access by applications other than the requesting application.

In some embodiments, the rate limiting is set by a node agent executing on a computing node. The computing node can include one or more processing devices, memory, input and output devices, networking devices, or the like. The node agent may control the execution of one or more isolated applications on the computing device. In some embodiments, the node agent operates in response to instructions received from an orchestrator. The orchestrator can control the distribution of one or more isolated applications to one or more computing nodes. For example, the orchestrator can instruct a node agent to initiate an application, replicate an application, pause an application, end an application, or the like. The orchestrator may monitor distribution of resources across a number of computing nodes to provide for efficient allocation and execution of processes.

When initializing an isolated application, the node agent may determine that the application requests exclusive access to a block storage resource. The request may be in the form of a declaration within the definition of the isolated application. The node agent may then generate a control group on the computing node that sets the rate limit for access to a block storage device. During execution of processes of the isolated application, the rate limit may prevent access to the block storage device to other applications.

In some embodiments, a node agent also resets the control group in response to detaching or ending an application that had exclusive access to a block storage device. For example, if the orchestrator indicates to a node agent to detach an application and move the application to another computing node, the node agent may move the application. After the application is moved, the node agent may reset the access rate that was set for the control group. Accordingly, the block storage device may then be allocated to other applications based on the reset access rate for other control groups. In some embodiments, the block storage resource may also be reassigned after the control group is reset. In some embodiments, the node agent may hold reassignment by excluding access to the control group assignments until after the control group is reset in order to prevent another block storage resource from claiming the device numbers assigned to the previous exclusive block storage resource.

In some embodiments, when a host computing node is restarted, the applications set for execution on the node may be restarted as well. The node agent may determine based on the definitions of the isolated computing spaces for the applications whether the application requests exclusive access to a block storage resource. For those applications requesting exclusive access to block storage resources, the node agent may create control groups to limit the access rate for those block resources. In some embodiments, the node agent may assign control groups to multiple isolated applications in order to secure the storage resource, but allow access for multiple related applications or other processes in an application hierarchy.

Although described with respect to isolated application and isolated processing spaces, the processes to provide exclusive access to a block storage device may be used with reference to other applications running on a computing node. For example, rate limiting certain applications may be performed with applications that represent virtual machines. In addition, providing such exclusive access can be performed in network configurations that do not include distributed computing systems as well as various memory and storage capabilities. For example, a block storage resource may be distributed across multiple nodes of a distributed computing system.

Figure 1:
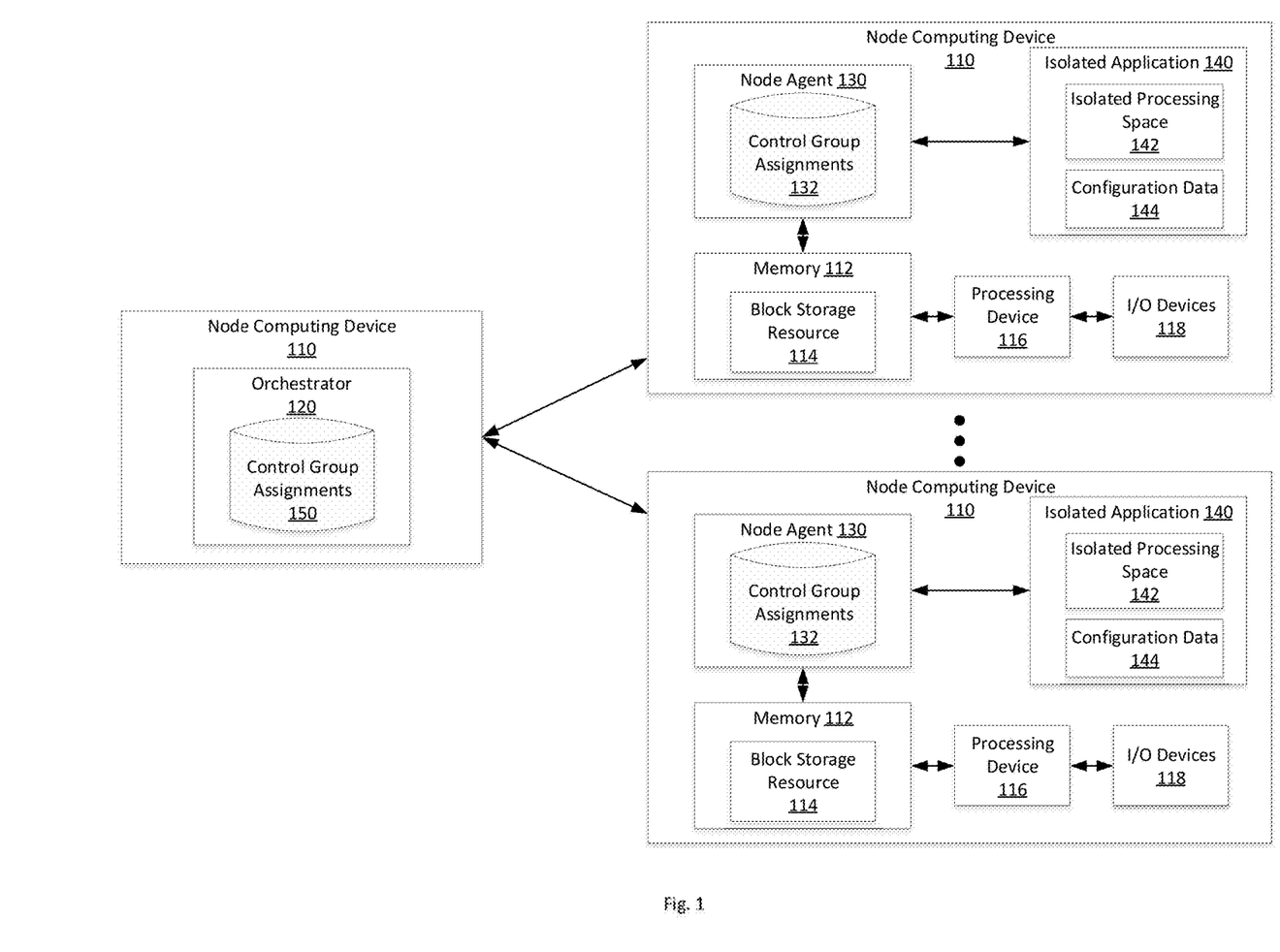
FIG. 1 is a block diagram that illustrates an example of a distributed computing system with secure storage access, in accordance with some aspects of the present disclosure.

FIG. 1 is a block diagram depicting an example of distributed computing system 100 having multiple node computing devices 110. One or more of the node computing devices 110 includes an orchestrator 120 that controls distribution of processes and application to other node computing devices 110. In some embodiments, the orchestrator 120 may also operate on the same node computing device 110 as other applications and processes. Although shown with a particular configuration, a distributed computing system 100 may have other configurations with fewer or additional node computing devices 110, different distributions of the orchestrator 120, or other variations. In some embodiments, the node computing devices 110 may include a memory 112, a processing device 116, and I/O devices 118, as shown in FIG. 1. In various embodiments, the node computing devices 110 include and other system resources such as network interface devices, additional processing devices or memory systems, display systems, or the like.

One or more computing devices 110 may also execute a node agent 130 and a number of isolated applications 140. The node agent 130 may communicate with the orchestrator 120 to determine isolated applications 140 to initiate on the node computing devices 110. The isolated applications 140 include the code and dependencies necessary for execution of the application. For example, the isolated applications 140 can include configuration data 144 that includes code for one or more processes of the isolated application 140, libraries that the code relies upon, or other definitions for use by the isolated application 140. The isolated application 140 includes an isolated processing space 142 for execution of one or more processes. The isolated processing space 142 may share processing resources such as processing device 116, network resources, I/O resources such as I/O devices 118, memory resources such as memory 112. The node agent 130 provides access to the resources for the isolated application 140 to use resources of the node computing device 110. While a single isolated application 140 is shown for each node computing device 110, the node computing devices 110 may each execute multiple isolated applications 140. For example, the node computing devices 110 may execute tens, hundreds, thousands, or more isolated applications 140 each having respective configuration data 144 and executing in isolated processing spaces 142.

To initiate an isolated application 140, the node agent 130 may receive an instruction from the orchestrator 120. The instruction may include code for one or more processes of the isolated application 140 as well as configuration data 144. For some isolated applications, the configuration data 144 can include a definition requesting exclusive access to a block storage resource 114. The node agent 130, in response to the request for exclusive access to block storage resource 114 can create a control group definition that provides the maximum access rate for the isolated application 140 that requested exclusive access. The control group is create and stored in a set of control group assignments 132 that define the access rates for isolated applications 140. In some embodiments, the control group assignments 132 may be provided to the orchestrator 120 to be stored in a global set of control group assignments 150.

The node agent 130 and node computing device 110 enables access to the block storage resource 114 through the control group assignments 132. Accordingly, control groups provide input and output access to various isolated applications 140 based on the access rates allocated to members of the control group. When an isolated application 140 requests exclusive access to a block storage resource 114, the control group created by the node agent provides 100% of the access rate to the isolated application 140. If another isolated application 140 attempts to access the block storage resource 114, it will be unable to access the resource because the access rate for applications that are not members of the control group have an access rate of 0. Thus, while another application may attempt to access an exclusive block storage resource 114, it will be unable to complete the access attempt. In some embodiments, a node agent 130 may also monitor attempt access by isolated applications 140 that are not members of the control group to flag potentially malicious application in the system.

Figure 2:
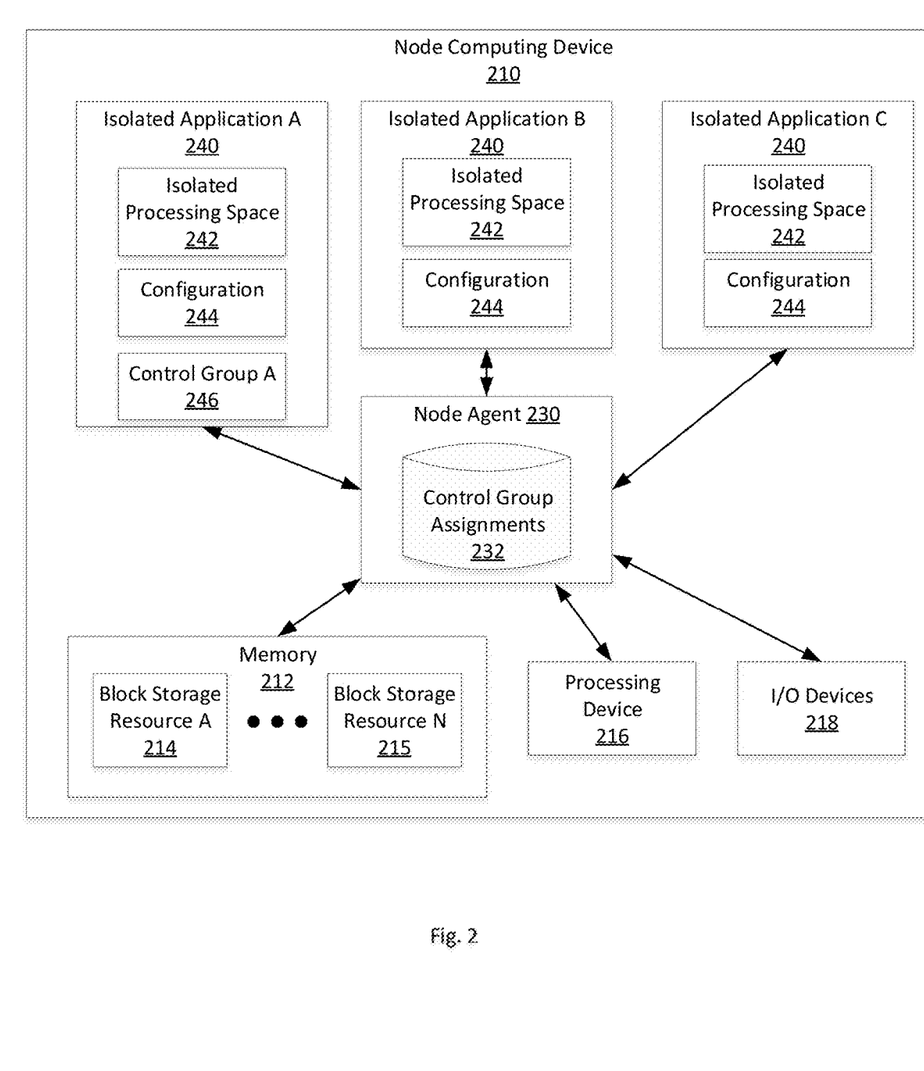
FIG. 2 is a block diagram that illustrates an example of a node computing device with secure storage, in accordance with some aspects of the present disclosure.

FIG. 2 is a block diagram depicting an example of a node computing device 210 providing exclusive access to a block storage resource 214, 215 to one or more isolated applications 240. The node computing device 210 may be the same or similar to the node computing devices 110 described with reference to FIG. 1. For example, the node computing device 210 include a memory 212, a processing device 216, and I/O devices 218, as shown in FIG. 2. In various embodiments, the node computing devices 210 include and other system resources such as network interface devices, additional processing devices or memory systems, display systems, or the like.

In some embodiments, the node computing device 210 may also execute a node agent 230 and a number of isolated applications 240. The node agent 230 may communicate with an orchestrator to determine isolated applications 240 to initiate and execute on the node computing device 210. The isolated applications 240 include the code and dependencies necessary for execution of the application. For example, the isolated applications 240 can include configuration data 244 that includes code for one or more processes of the isolated application 240, libraries that the code relies upon, or other definitions for use by the isolated application 240. The isolated application 240 includes an isolated processing space 242 for execution of one or more processes. The isolated processing space 242 may share processing resources such as processing device 216, network resources, I/O resources such as I/O devices 218, memory resources such as memory 212. The node agent 230 provides access to the resources for the isolated application 240 to use resources of the node computing device 210. While isolated applications A, B, and C, the node computing devices 210 may each execute multiple isolated applications 240. For example, the node computing device 210 may execute tens, hundreds, thousands, or more isolated applications 240 each having respective configuration data 244 and executing in isolated processing spaces 242.

To initiate an isolated application 240, the node agent 230 may receive an instruction from an orchestrator that manages the node computing device 210. The instruction may include code for one or more processes of the isolated application 240 as well as configuration data 244. For some isolated applications, the configuration data 244 can include a definition requesting exclusive access to a block storage resource in memory 212. The node agent 230, in response to the request for exclusive access to a block storage resource can create a control group definition that provides the maximum access rate for the isolated application 240 that requested exclusive access. The control group is create and stored in a set of control group assignments 232 that define the access rates for isolated applications 240. In some embodiments, the control group assignments 232 may be provided to the orchestrator to be stored in a global set of control group assignments.

As an example shown in FIG. 2, control group A 246 is created for isolated application A 240 in response to a request in the configuration 244 for exclusive access to a block storage resource in memory 212. In some embodiments, the memory 212 may include a number of block storage resources (e.g., block storage resources A-N 214, 215). The node agent 230 can identify one or more block storage resources in memory 212 that match the requested space by the isolated application A 240. For example, the node agent 230 may identify block storage resource A 214 as an available resource to provide exclusive access to the isolated application A 240. The node agent 230 then creates a control group for the block storage resource A 214 and set the access rate limit for isolated application A 240 to 100%. Accordingly, if another isolated application (e.g., isolated application B or isolated application C) attempts to access block storage resource A 214, then the node agent will provide a rate limit of zero and thus provide no access to read or write to block storage resource A 214. In some embodiments, a node agent 230 may also monitor attempt access by isolated applications 240 that are not members of control group A 246 to flag potentially malicious application in the system.

In some embodiments, the node agent 230 resets control group A 246 in response to detaching or ending isolated application A 240 that had exclusive access to block storage device A 214. For example, if an orchestrator indicates to a node agent 230 to detach the isolated application and move the application to another computing node, the node agent 230 may detach the application from the node computing device 210. After isolated application A 240 is moved, the node agent may reset the access rate that was set for control group A 246. Accordingly, the block storage resource A 214 may then be used by other isolated applications 240 based on the reset access rate for other control groups. In some embodiments, the block storage resource may also be reassigned after the control group is reset. In some embodiments, the node agent 230 may hold reassignment of storage resources and control groups by excluding access to the control group assignments until after the control group reset is complete. This can prevent conflicts from a race condition where an isolated application 240 attempts to claim a storage resource that has a control group attached before the control group is reset.

In some embodiments, when the node computing device 210 is restarted, the applications set for execution on the node may be restarted as well. The node agent 230 may determine based on the definitions of the isolated computing spaces for the applications whether an isolated application 240 requests exclusive access to a block storage resource. For those applications requesting exclusive access to block storage resources, the node agent 230 may create control groups to limit the access rate for those block storage resources. In some embodiments, the node agent 230 may assign control groups to multiple isolated applications 240 in order to secure a block storage resource, but allow access for multiple related applications or other processes in an application hierarchy. For example, isolated application A may include more than one process operating in isolated processing space 242, and each of those may inherit control group A 246 for access to block storage resource A 214.

In some embodiments, an isolated application 240 may request exclusive access to a block storage resource on a temporary basis. The configuration 244 of isolated application A 240 may request exclusive access to a block storage resource in its definition, but the isolated application A 240 may release the block storage resource in response to a trigger such as completion of a task, a time frame, or another event. In some embodiments, the configuration 244 may not include a definition requesting exclusive access to a block storage resource, but a process executing in isolated processing space 242 may request exclusive access to a block storage resource at a later time. For example, a process may request exclusive access in response to starting a particular operation or accessing a particular portion or type of data. An isolated application 240 may request exclusive access to a block storage resource prior to decrypting data for processing. The isolated application 240 can then release the block storage resource in response to encrypting data or otherwise completing an operation or data access.

Figure 3:
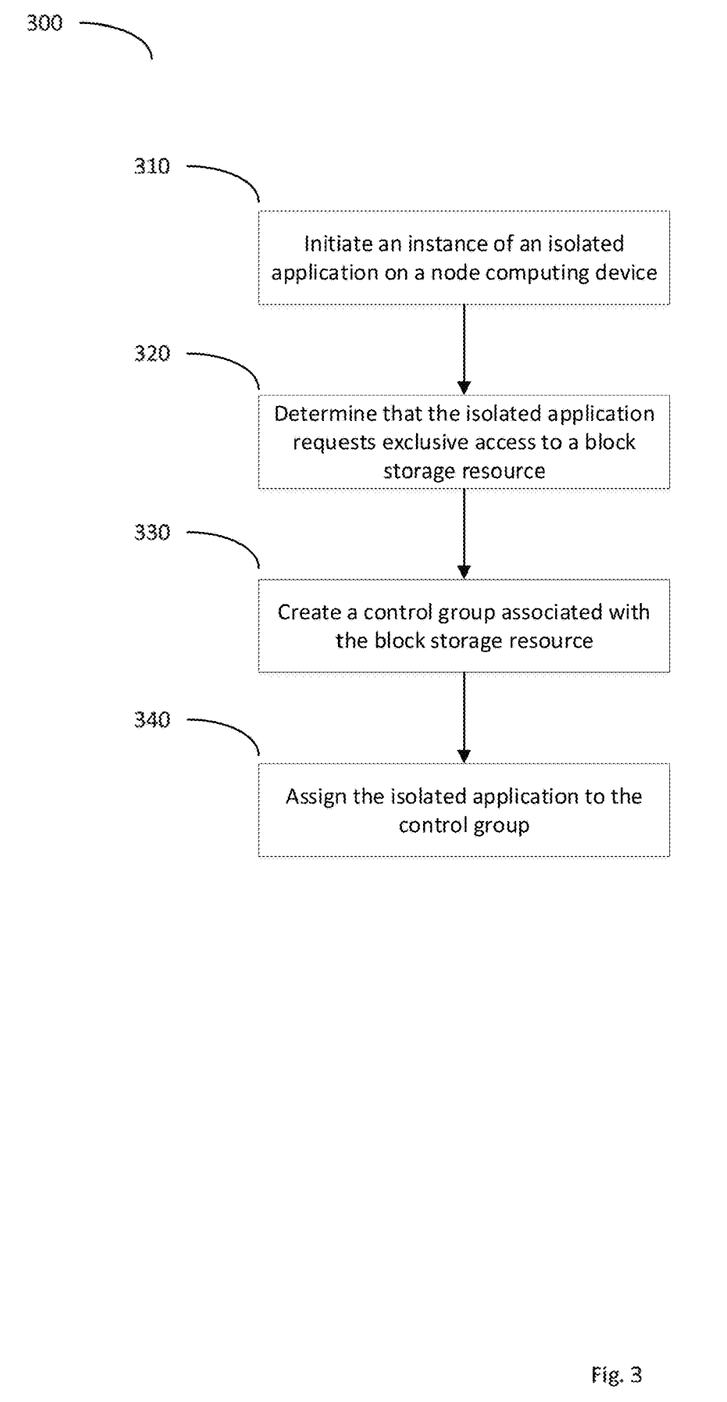
FIG. 3 is a flow diagram that illustrates an example method of providing secure storage, in accordance with some aspects of the present disclosure.

FIG. 3 is a flow diagram that illustrates an example method 300 of providing exclusive access to a block storage resource to an isolated application, in accordance with some aspects of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

In block 310, a node agent initiates an instance of an isolated application on a node computing device. For example, the node agent may receive an instruction from an orchestrator to initiate the isolated applications. In some embodiments, the isolated application may be a pod that includes one or more containers that operate in isolated processing spaces. To initiate the isolated application, the node agent may secure resources for the isolated application according to configuration data, definitions, and libraries include in a package along with code to execute the isolated application.

In block 320, the node agent determines that the isolated application requests exclusive access to a block storage resource. For example, the isolated application may include a configuration definition that requires exclusive access to a block storage resource. The node agent may access the definition during an initialization process and determine a block storage resource that provides the requested storage. In some embodiments, the node agent may receive the request from an orchestrator with the instruction to initiate the isolated application rather than in the definition of the isolated application.

In block 330, the node agent creates a control group associated with the block storage resource. The node agent can associate the control group with the block storage resource as well as the isolated application. The node agent can create the control group to provide 100% of the access rate for the block storage resource to the isolated control group requesting the exclusive access. Other applications or processes requesting access to the block storage resource may be set with no access availability to the exclusive storage resource.

Figure 4:
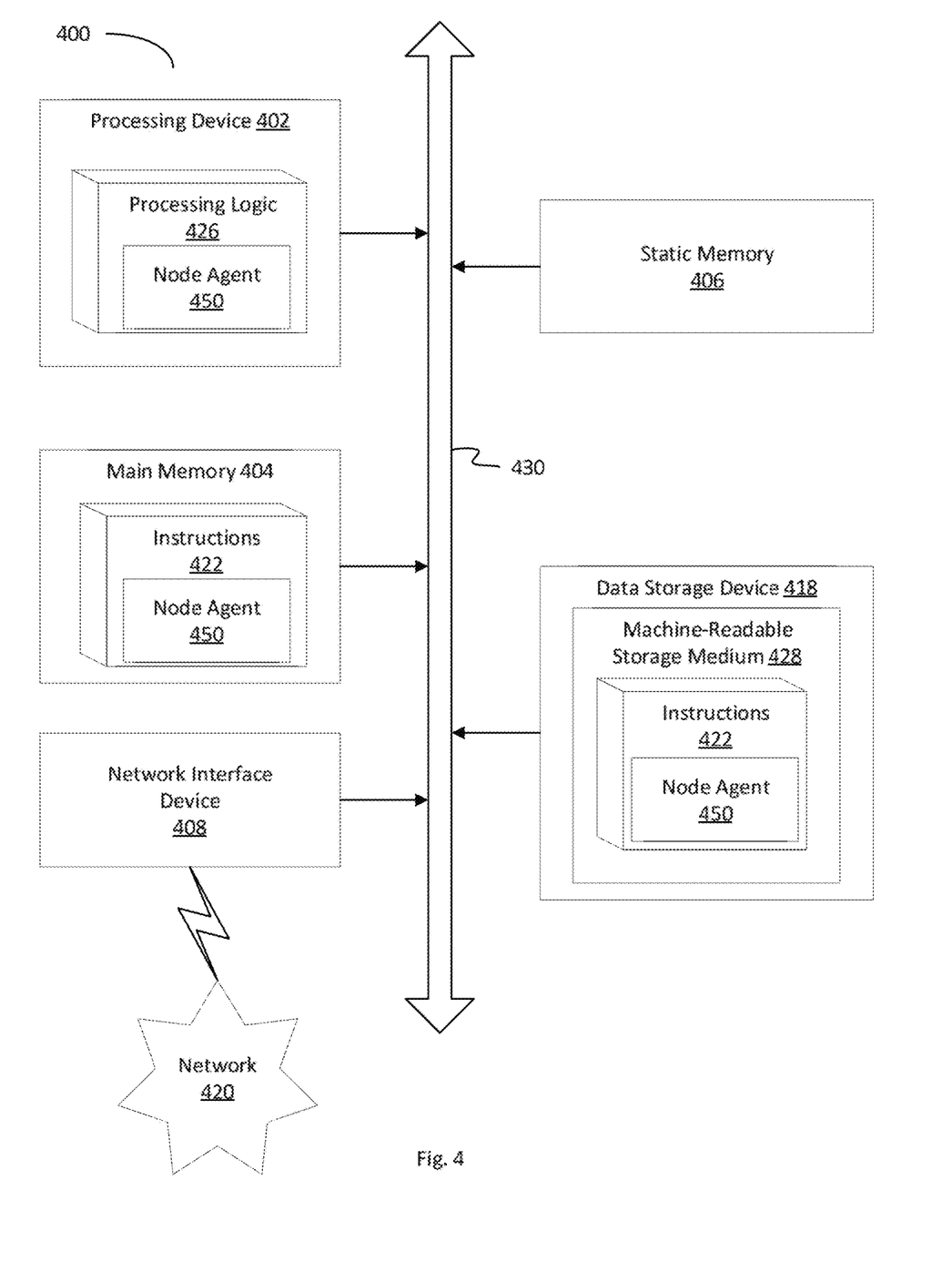
FIG. 4 illustrates an illustrative computer system operating in accordance with one or more aspects of the present disclosure.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute processing logic 426, which may be one example of a component of system 100 shown in FIG. 1 or node computing device 210 as shown in FIG. 2, for performing the operations and steps discussed herein. For example, the processing logic 426 may execute a node agent 450, as well as one or more isolated applications or isolated processing spaces to provide exclusive access to a block storage resource.

The data storage device 418 may include a machine-readable storage medium 428, on which is stored one or more set of instructions 422 (e.g., software) embodying any one or more of the methodologies of functions described herein, including instructions to cause the processing device 402 to execute an orchestrator, node agent, isolated processing spaces, isolated applications, or the like as discussed herein. The instructions 422 may also reside, completely or at least partially, within the main memory 404 or within the processing device 402 during execution thereof by the computer system 400; the main memory 404 and the processing device 402 also constituting machine-readable storage media. The instructions 422 may further be transmitted or received over a network 420 via the network interface device 408.

The machine-readable storage medium 428 may also be used to store instructions to perform a method for script analysis service, as described herein. While the machine-readable storage medium 428 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any apparatuses for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium;

read-only memory (ROM); random-access memory (RAM); erasable programmable memory (e.g., EPROM and EEPROM); flash memory; or another type of medium suitable for storing electronic instructions.

Figure 5:
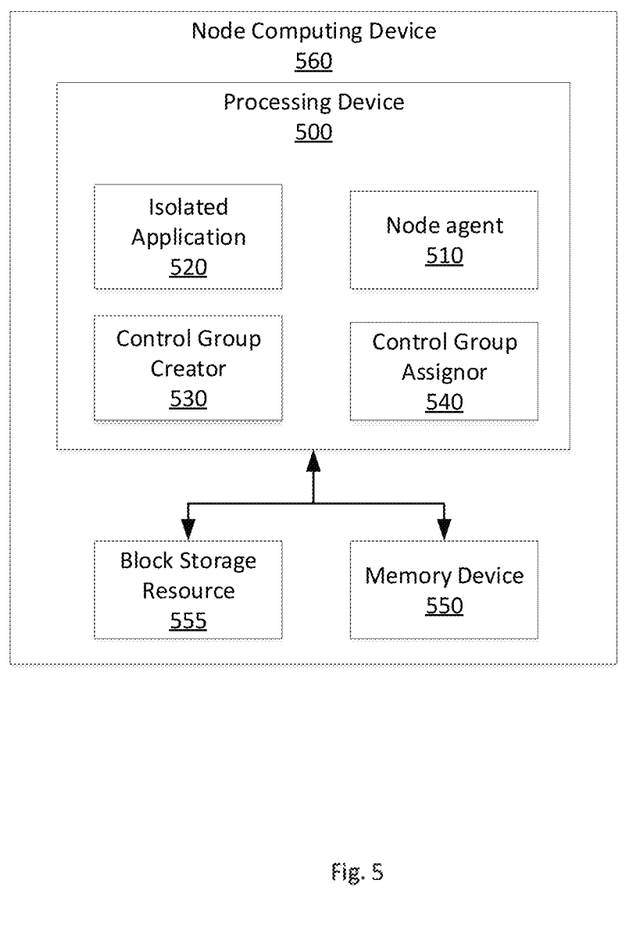
FIG. 5 is a block diagram that illustrates an example of a script analysis service in accordance with some aspects of the present disclosure.

FIG. 5 is a block diagram that illustrates an example of a system that provides exclusive access to block storage resources, in accordance with some aspects of the present disclosure. A processing device 500 is operatively coupled to a memory device 550. In some embodiments, the processing device 500 and memory device 550 may be part of a node computing device 560. The processing device may include a node agent 510, an isolated application 520, a control group creator 530, and a control group assignor 540. The processing device may also be coupled with a block storage resource 555. In some embodiments, the block storage resource 555 may be part of the memory device 550. For instance, the block storage resource 555 may be in a different section or type of memory than the memory device 550 as shown in FIG. 5 or may be a resource of memory device 550. The node agent 510 may initiate an instance of the isolated application 520 on the node computing device 560 in response to receiving an instruction to do so from an orchestrator. The node agent 510 can determine that the isolated application 520 requests exclusive access to a block storage device. The control group creator 530 can then create a control group associated with the block storage resource 555 and set an access rate limit to zero for non-members of the control group. The control group assignor 540 can then assign the isolated application 520 to the control group to enable exclusive access to the isolated application 520.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method comprising:
   initiating an instance of an isolated application on a node computing device;
   determining, by a processing device, that the isolated application requests exclusive access to a block storage resource;
   creating, by the processing device, a control group associated with the block storage resource and the isolated application;
   providing access of the block storage resource to members of the control group and preventing access to the block storage resource for non-members of the control group by setting an access rate limit to zero for non-members of the control group; and
   assigning the isolated application to the control group.

2. The method of claim 1, further comprising:
   detaching the isolated application from the node computing device; and
   resetting a control group access rate for the block storage resource.

3. The method of claim 2, further comprising preventing attachment of a new isolated application to a block storage device comprising the block storage resource until the control group access rate is reset.

4. The method of claim 1, further comprising assigning additional processes in a hierarchy of the isolated application to the control group.

5. The method of claim 1, further comprising:
receiving a request to access the block storage resource by a second isolated application;
determining that the second isolated application does not belong to the control group; and
denying access based on the access rate limit set to zero for non-members of the control group.

6. The method of claim 1, further comprising:
restarting the node computing device;
reinitiating the isolated application on the node computing device; and
recreating the control group and resetting the access rate limit to zero for non-members of the control group.

7. The method of claim 1, wherein the isolated application comprises a plurality of processes performing operations in respective isolated processing spaces that share one or more of memory or network access.

8. The method of claim 1, wherein determining that the isolated application requests exclusive access to a block storage resource comprises receiving, by an orchestrator, a request from the isolated application for exclusive access to a storage block.

9. The method of claim 1, wherein creating the control group is performed by a node agent executing on the node computing device in response to an instruction from an orchestrator.

10. A system comprising:
a memory device; and
a processing device operatively coupled to the memory device, the processing device to:
initiate an instance of an isolated application on a node computing device;
determine, by a node agent executed by the processing device, that the isolated application requests exclusive access to a block storage resource;
create a control group associated with the block storage resource and the isolated application;
provide access to members of the control group and prevent access to the block storage resource for non-members of the control group by setting an access rate limit to zero for non-members of the control group; and
assign the isolated application to the control group.

11. The system of claim 10, wherein the processing device is further to:
detach the isolated application from the node computing device; and
reset a control group access rate for the block storage resource.

12. The system of claim 11, wherein the processing device is further to prevent attachment of a new isolated application to a block storage device comprising the block storage resource until the control group access rate is reset.

13. The system of claim 10, wherein the processing device is further to assign additional processes in a hierarchy of the isolated application to the control group.

14. The system of claim 10, wherein the processing device is further to:
receive a request to access the block storage resource by a second isolated application;
determine that the second isolated application does not belong to the control group; and
deny access based on the access rate limit set to zero for non-members of the control group.

15. The system of claim 10, wherein the processing device is further to:
restart the node computing device;
reinitiate the isolated application on the node computing device; and
recreate the control group and resetting the access rate limit to zero for non-members of the control group.

16. The system of claim 10, wherein the isolated application comprises a plurality of processes performing operations in respective isolated processing spaces that share one or more of memory or network access.

17. The system of claim 10, wherein the processing device is further to execute a node agent to create the control group in response to an instruction from an orchestrator.

18. A non-transitory computer-readable storage medium including instructions that, when executed by a processing device, cause the processing device to:
initiate an instance of an isolated application on a node computing device;
determine, by the processing device, that the isolated application requests exclusive access to a block storage resource;
create, by the processing device, a control group associated with the block storage resource and the isolated application;
provide access to members of the control group and prevent access to the block storage resource for non-members of the control group by setting an access rate limit to zero for non-members of the control group; and
assign the isolated application to the control group.

19. The non-transitory computer-readable medium of claim 18, wherein the instructions further cause the processing device to:
detach the isolated application from the node computing device; and
reset a control group access rate for the block storage resource.

20. The non-transitory computer-readable medium of claim 18, wherein the instructions further cause the processing device to:
receive a request to access the block storage resource by a second isolated application;
determine that the second isolated application does not belong to the control group; and
deny access based on the access rate limit set to zero for non-members of the control group.

* * * * *